United States Patent [19]

Kyrias

[11] 4,024,618
[45] May 24, 1977

[54] METHOD OF FABRICATING GAS TRANSMITTING BODY FOR USE IN BUBBLE SHEARING

[75] Inventor: Gilbert M. Kyrias, Littleton, Colo.

[73] Assignee: FMC Corporation, Chicago, Ill.

[22] Filed: Aug. 8, 1975

[21] Appl. No.: 603,048

Related U.S. Application Data

[60] Division of Ser. No. 441,573, Feb. 11, 1974, Pat. No. 3,927,152, and a continuation-in-part of Ser. No. 123,693, March 12, 1971, abandoned.

[52] U.S. Cl. .............................. 29/157 C; 29/412; 29/455 R; 156/296; 156/297; 156/250
[51] Int. Cl.² ...................... B23P 15/00; B01F 3/04
[58] Field of Search ................. 29/157 C, 415, 412, 29/455 R; 156/296, 297, 250; 261/124, DIG. 75, 122; 239/426

[56] References Cited

UNITED STATES PATENTS

| | | | |
|---|---|---|---|
| 1,677,502 | 7/1928 | Sweetland | 261/124 |
| 2,081,382 | 5/1937 | Piatt | 261/122 |
| 2,708,571 | 5/1955 | Fischerstrom et al. | 261/124 |
| 3,256,802 | 6/1966 | Karr | 261/122 |
| 3,397,871 | 8/1968 | Hasselberg | 261/DIG. 75 |
| 3,403,065 | 9/1968 | Van Welderen Rengers et al. | 156/296 |
| 3,545,731 | 12/1970 | McManus | 261/122 |
| 3,668,049 | 6/1972 | Silfverlin | 156/296 |
| 3,736,198 | 5/1973 | Leistner | 156/296 |

FOREIGN PATENTS OR APPLICATIONS 694,918 7/1953 United Kingdom ............... 261/122

Primary Examiner—C.W. Lanham
Assistant Examiner—Daniel C. Crane
Attorney, Agent, or Firm—Dressler, Goldsmith, Clement, Gordon & Shore, Ltd.

[57] ABSTRACT

Method and apparatus for bubble shearing are disclosed in which nascent bubbles are formed by flowing gas through the very small capillary openings of a gas diffusing surface into a moving liquid that shears the nascent bubbles off as it moves past the capillary openings. In the apparatus disclosed, the gas diffusing surface forms one wall of a liquid transmitting slot through which the shearing liquid flows as it shears off fine gas bubbles.

A gas transmitting body or gas "bar" for use in the bubble shearing apparatus is disclosed. The gas transmitting body has at least one wall with a plurality of gas transmitting passages extending therethrough terminating in capillary openings. The maximum size of the capillary openings is given, as well as the maximum distance of the most remote capillary openings from an edge of the gas diffusing surface defining one boundary thereof. Improved and preferred values for these parameters are also given. Other structural features of the gas transmitting body are disclosed.

A rapid and efficient method of fabricating the gas transmitting body of this invention in which the plurality of gas transmitting passages through the body is defined by discrete tubes embedded in the wall of the gas transmitting body as a matrix is also disclosed. Suitable and preferred methods of applying binder to form the matrix, as well as methods of positioning the discrete capillary tubes to be embedded in the matrix, are disclosed.

10 Claims, 27 Drawing Figures

METHOD OF FABRICATING GAS TRANSMITTING BODY FOR USE IN BUBBLE SHEARING

This application is a division of my co-pending application entitled "Method and Apparatus for Bubble Shearing and Method of Fabricating the Apparatus," filed Feb. 11, 1974 and assigned Ser. No. 441,573, now Pat. No. 3927152, which was a continuation-in-part of my application entitled "Gas Diffuser," filed Mar. 12, 1971 and assigned Ser. No. 123,693, now abandoned.

This invention relates to a gas transmitting body for use in diffusing fine gas bubbles into a body of liquid in the process known as "bubble shearing," and to a method for fabricating the gas transmitting body.

BACKGROUND OF THE INVENTION

It is important in various processes to diffuse a gas into a body of liquid in a manner that will disperse the gas uniformly through a large portion of the liquid and result in as rapid as possible absorption of the gas by the liquid. Diffusion of a gas into a body of liquid in this way is useful, for example, in a large number of chemical and petrochemical processes. It is also important in certain sewage treatment processes. It is becoming increasingly important in the treatment of natural bodies of water with air, oxygen, or ozone in order to revive polluted rivers, lakes, bays, etc.

When, for purposes of economy or for any other reason, gases used in the treatment of a body of liquid should not be allowed to escape from the surface of the liquid, it is important that the method and apparatus used be such that all, or nearly all, the gas dissolves in the liquid before any substantial number of gas bubbles can rise to the surface. In every case, it is usually desirable that the absorption of the gas into the liquid proceed as rapidly as possible.

It has long been known that method and apparatus employing the phenomenon known as "bubble shearing" are well adapted to the production of quite small gas bubbles in a liquid. In this method, a gas is passed through the capillary passages of a foraminous material to be introduced into a stream of liquid on the other side of the material. The gas emerges at the boundary surface or gas diffusing surface of the foraminous material in a number of locations spaced from each other, where it starts to form a plurality of fine bubbles, or in other words forms "nascent" gas bubbles. The liquid into which the gas is thus introduced is caused to move more or less rapidly past the capillary openings of the foraminous material. As a result, the viscous shear forces exerted by the moving body of liquid shear off the partially formed or nascent gas bubbles before they can grow to such a size that their natural buoyancy in the liquid will cause them to break the surface tension that tends to hold them on the boundary surfaces of the gas transmitting foraminous material.

SUMMARY OF THIS INVENTION

The gas transmitting body of this invention provides a gas diffusing surface of the type just mentioned that has very small capillary openings, no larger than about 100 microns in diameter. At least one wall forming the gas diffusing surface has an edge defining a boundary of the surface, and the remote of the capillary openings is about 0.1 inch from that boundary edge. Improved results are obtained if the distance referred to is no more than about 0.5 inch, still further improved results if it is no more than about 0.1 inch, and best results if it is no more than about 0.05 inch.

Other structural details of the gas transmitting body are disclosed and claimed below, including the close proximity of all capillary openings to the boundary defining edge, a rounded form for that edge, and the shape, size and location of the capillary openings in the gas diffusing surface. In a preferred embodiment, the plurality of gas transmitting passages through the gas transmitting body is defined by discrete tubes embedded in one wall of the gas transmitting body as a matrix.

The method of this invention defines steps by which the preferred embodiment of the gas transmitting body of the invention just mentioned can be rapidly and efficiently fabricated. Specific methods are disclosed and claimed for positioning a plurality of hollow capillary strands to be embedded in the wall of the gas transmitting body, as well as steps for applying the binder that will form the matrix in which the hollow strands are embedded. Steps for assembling the support plates and other structural elements of the gas transmitting body of this invention are also disclosed.

The term "capillary openings" is used in this specification and the appended claims to mean any openings small enough to produce fine gas bubbles, no matter what the nature of the gas diffusing surface is one which the bubbles are formed, or the nature of the gas transmitting passages through which gas flows to reach those openings.

BRIEF DESCRIPTION OF DRAWINGS

FIG. 8D is an enlarged sectional view taken along the line 8B—8B of FIG. 8A;

FIG. 10A is a fragmentary plan view of one of the support plates of FIG. 9 showing a pluralityof rovings of hollow capillary strands in position across said plate;

FURTHER DESCRIPTION OF THE INVENTION

When the method and apparatus of my application for patent filed Feb. 11, 1974 and assigned Ser. No. 441,573, of which this application is a division, are defined hydrodynamically, the following two requirements must be met;

1. A partially developed laminar boundary layer is established above a substantial number — in the method, at least about the first one-quarter measured from the leading edge of the gas diffusing surface — of the capillary openings in the gas diffusing surface at which bubbles are formed and sheared off.

2. The liquid over all the capillary openings that are present in the gas diffusing surface is substantially free of any type of flow over than partially or fully developed substantially parallel laminar flow.

It has been found that in the gas transmitting body of the present invention these two hydrodynamic requirements can best be met if the capillary openings in the gas diffusing surface are all positioned in close proximity to the edge of the surface defining one boundary thereof which during use is the leading edge over which the shearing liquid flows. Thus, as indicated above, it has been found that the maximum distance from the boundary edge of the gas diffusing surface of the gas transmitting body of this invention to the most remote small capillary opening in that surface should be no more than about 1.0. inch. Values of 0.5 inch, 0.1 inch and 0.05 inch for this distance produce improved, further improved, and preferred results, respectively. As an example, the gas transmitting body of this invention has been used to produce bubbles of air and water some of which has been used to produce bubbles of air and water some of which are as small as ten microns in diameter, with the median diameter being no more than about 25 to 30 microns.

When distances of this order of magnitude have been used in prior art devices, it has only been with very large openings in the gas diffusing surface, such as the holes in British Pat. No. 1,039,702, which are at least 400 times as large in area as the 100 micron or smaller diameter capillary openings of the present invention. As already indicated, substantially all the capillary openings in the gas diffusing surface of the gas transmitting body of this invention have a diameter of no more than about 100 microns, and still better results are achieved with smaller capillary openings. It has been universally believed by those skilled in the art of bubble shearing that with capillary openings as small as are employed here, it is necessary to use a very much wider band of capillary openings than applicant has found to be required.

When the capillary openings in the gas diffusing surface are in close proximity to the leading edge over which the bubble shearing liquid flows, the partially developed laminar boundary layer overlying those capillary openings has little time in which to build up into a thick layer. When the nascent bubbles protrude above the interface between the laminar boundary layer and the free stream above it, they are exposed to the full force of the free stream, which is moving with greater velocity than the liquid in the laminar boundary layer. For this reason, the nascent gas bubbles are sheared off before they can grow to any very large diameter.

The material defining the capillary openings in the gas diffusing surface of the gas transmitting body of this invention is also important. The bubble shearing achieved will be most effective when the material surrounding the capillary openings in the gas diffusing surface has a low wettability, or in other words a high contact angle, with the shearing liquid. Under ordinary operating conditions, impurities contained in tap water form a coating on materials such as various metals and glass, and as a result such materials have a contact angle of approximately 20° with the tap water. Contact angles of 90° will give the best results with this invention. Materials having a contact angle with tap water of approximately 45° include, for example, polyvinyl chloride and polymethyl methacrylate. Materials having a contact angle with tap water of approximately 90° include, for example, fluorosilicones and fluorocarbon plastics such as the material sold under the trademark Teflon.

SPECIFIC EMBODIMENTS OF BUBBLE SHEARING APPARATUS

FIGS. 1 through 4 illustrate specific embodiments of bubble shearing apparatus in which the gas transmitting body of this invention can be incorporated.

DIFFUSER ASSEMBLY

Figures 1, 3, 4:
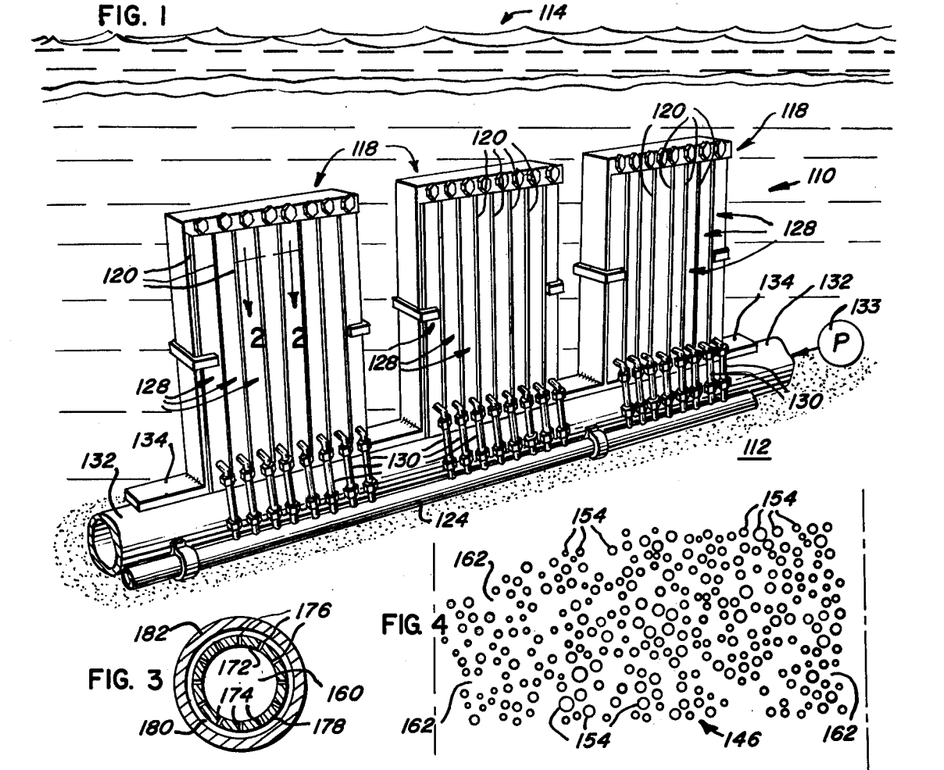
FIG. 1 is an illustration of a diffuser assembly having a plurality of units or modules each of which contains a plurality of gas transmitting bodies or gas bars constructed in accordance with the present invention.
FIG. 3 is a schematic cross sectional view of a gas transmitting body and a slot-defining member that are spaced to define an annular shearing liquid transmitting slot in another embodiment of the bubble shearing apparatus disclosed and claimed in the application of which this is a division.
FIG. 4 is a drawing made from a photomicrograph giving a fragmentary view of an actual gas diffusing surface of a gas transmitting body according to this invention, as seen from the position indicated by line 4—4 of FIG. 2.

Although a diffuser assembly 110 constructed in accordance with the invention of my co-pending application Ser. No. 441,573, now U.S. Pat. No. 3,927,152, can be utilized in many different environments, the diffuser assembly is shown in FIG. 1 at the bottom 112 of a lake or large body of polluted water 114. The polluted water is deficient in oxygen and this hampers normal life processes required to support fish life and to maintain the proper sanitary conditions in lake 114. By dissolving oxygen in the water, the natural processes of water purification are accelerated. A method and an apparatus for supplementing the natural process of water purification by the addition of oxygen to the water is described in U.S. Pat. No. 3,505,213 to Anthony and Fulton and entitled "Method and Apparatus for Purifying a Natural Body of Water." Although it is contemplated that diffuser assembly 110 will advantageously be utilized to promote the absorption of oxygen by bodies of water, it should be understood that it can be utilized to promote the absorption of other gases by other bodies of liquid as well.

Diffuser assembly 110 includes a plurality of units or modules 118 having substantially vertical and parallel discharge openings or slots 120 from which a mixture of water and small bubbles 122 (FIG. 2) of oxygen flow into lake 114 to oxygenate the lake. Slots 120 may if desired be disposed at other angles to the lake bed, but the vertical orientation is preferred in order to permit fresh supplies of water for oxygenation to rise between the slots most readily from the lower levels of the body of water.

Small bubbles of oxygen 122 are dispersed into a relatively large area of the lake and rise slowly toward the surface of the lake. As bubbles 122 rise, the oxygen within the bubbles is absorbed by the oxygen deficient waters of the lake. Since bubbles 122 of oxygen rise slowly and are very small, with a relatively large surface area per unit volume of oxygen contained within the bubbles, substantially all of the oxygen is absorbed as the bubbles rise toward the surface of lake 114. If the bubbles were relatively large, they would ascend quickly toward the surface of the lake so that there would not be sufficient time for the oxygen to be absorbed. This could result in a "bubbling-off" or dissipation of the oxygen to the atmosphere. Of course, dissipation of oxygen into the atmosphere increases the cost of producing the desired oxygen content in the water of lake 114.

The modules or units 118 are connected with a common source of oxygen under pressure by a gas main or line 124 (FIG. 1). Gas main 124 is connected with gas disperser assemblies or bars 128 in each of the units 118 by feeder lines 130. In addition, each of the units 118 is supplied with water under pressure by a common main or pipe 132 to which the diffuser units 118 are connected by a base plate 134. A suitable pump with adjustable output velocity, schematically shown at 133, may be associated with main pipe 132 and operates to draw water from lake 114 and direct it at various velocities, as desired, along pipe 132. A suitable filter may be used to prevent solids from reaching the pump or the disperser assemblies 128. Thus, when the diffuser assemblies 118 are being utilized to oxygenate lake 114, the diffuser assemblies are continuously supplied with gaseous oxygen or gas line 124 and are continuously supplied with water by water main 132. Although gas line 124 and water main 132 have been shown in FIG. 1 resting on bottom 112 of the lake, it should be understood that they could be suspended or otherwise supported above the bottom of the lake, if desired.

Figure 2:
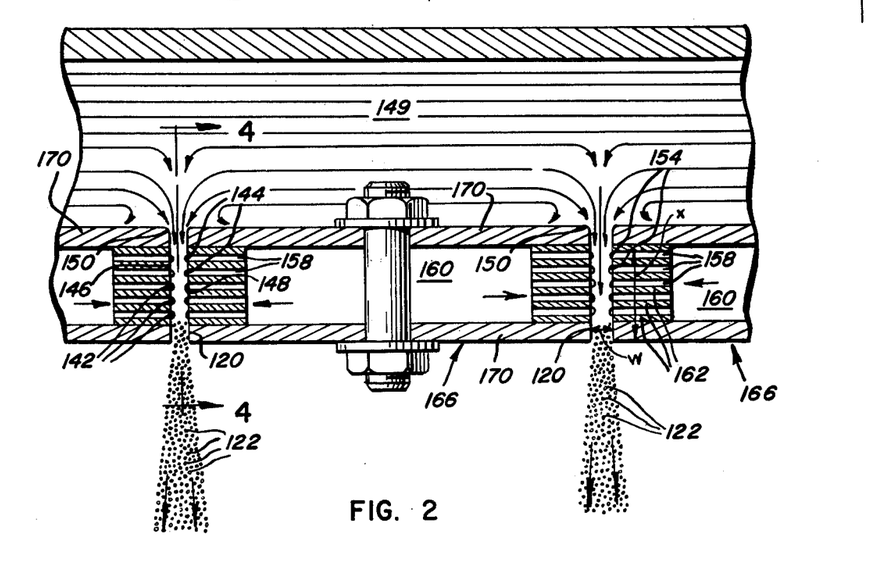
FIG. 2 is an enlarged fragmentary cross sectional view, schematic in nature, taken along the line 2—2 of FIG. 1, illustrating the relationship between gas transmitting bodies or gas bars constructed according to this invention, a water supply chamber, and a plurality of discharge slots in one of the diffuser units of FIG. 1.

Extremely fine bubbles 122 are formed on each side of slots 120 defind by the gas disperser assemblies or bars 128 (see FIG. 2). Thus, small bubbles 122 are formed in groups of bubbles 142 and 144 which extend for the full length of opposite longitudinally extending side walls 146 and 148 of slots 120, each of which slots is approximately 2 inches in vertical length in one embodiment of this apparatus. The bubbles are swept away by water which flows in a continuous stream from chamber 149 through slots 120 into the lake. Water chamber 149 is connected in fluid communication with water line 132 by passages (not shown) extending through mounting plate 134 (FIG. 1).

Because substantially the only effective bubble forming force in this apparatus is the viscous shearing force of the liquid flow, and buoyancy plays essentially no role, the bubbles are swept away before they grow too large. The bubbles produced are so small that it is difficult or impossible for the observer to distinguish individual bubbles by the naked eye, and the bubbles thus take on the appearance of a "gas fog" or milky cloud of bubbles which extend outwardly for a substantial distance from diffuser assembly 110. Since the slowly rising bubbles 122 are dispersed over a relatively large area of lake 114, the gas in the bubbles can be absorbed by the water of the lake before the bubbles reach the surface of the lake. Bubbles 122 are formed at open ends 154 of capillary passages 158, which extend from gas plenum 160 through side walls 146 and 148 of slot 120 (FIG. 2). Each of the upright gas chambers 160 is connected in fluid communication with gas line 124, so that a continuous stream of gas under pressure flows from line 124 through feeder tubes 130 (FIG. 1) to gas plenums 160, and then to open ends 154 of capillary passages 158.

It should be pointed out that this bubble shearing apparatus is useful in applications, as for example some industrial applications, in which an entire quantity of liquid into which gas bubbles are to be diffused is passed through pump 133, main liquid line 132, liquid chamber 149, and slots 120. In such a case, the term "body of liquid into which fine bubbles are to be diffused" refers to all the liquid that has already flowed through slots 120 of the gas diffusing apparatus and has been accumulated in a subsequent pipe, channel, or other vessel for further handling.

SHEARING LIQUID TRANSMITTING SLOT

As water leaves chamber 149 to enter any given slot 120, it flows past rounded leading edges 150 on walls 146 and 148. When water is the shearing liquid (as in FIG. 2) the length of travel through slot 120 should preferably be at least about two times the width of the slot, although it may be less about two times the width of the slot, although it may be less for more viscous liquids. These features, especially the rounded leading edges, will help to establish in slot 120 the substantially parallel laminar flow, including a partially developed laminar boundary layer, that is characteristic of this invention. The L/D ratio should not be made too large, however, or there will be too high a pressure drop and accompanying energy requirement for the apparatus, and a clogging problem with some applications such as sewage treatment.

As illustrated in FIG. 2, each slot 120 throughout its length should preferably have a substantially uniform width measured perpendicular to the direction of flow. In the embodiment shown, slot 120 has a rectangular transverse cross section from its inlet end to its discharge end. As will be seen, a substantially straight, unimpeded path is provided for liquid flow through the slot, by utilizing side walls 146 and 148 that are substantially planar and parallel to each other. These features help to produce regularity and stability of flow of the shearing liquid thrugh the liquid transmitting slot, which encourages the establishment of the defined laminar flow regime.

As already indicated above, the width of slot 120 may be varied depending upon a number of factors including, among other things, the nature of the shearing liquid. A slot width of 0.5 inches or even more may be used with shearing liquids of high viscosity, although with wider slots greater precautions may have to be taken to achieve substantially parallel laminar flow through the slot. A slot width of 0.125 inches has been used with sewage containing 6 percent suspended solids. A slot width of 0.040 inches has been used with1 percent suspended solids sewage, and a slot width of 0.030 inches or even as low as 0.020 inches with water as the shearing liquid.

Other things being equal, the slot width "$w$" (FIG. 2) should be wider for larger capillary openings, so that collision and coalescence of fine bubbles to form larger bubbles can be minimized. The slot width may be made wider than would otherwise be feasible when the shearing liquid employed, such as for example sewage, has a higher viscosity. This will have the advantage of helping to minimize clogging of the slot by particulate matter in suspension in the sewage. In the design of an apparatus according to this invention, the considerations mentioned must be balanced against the fact that the smaller the width of slot 120 is made, the lower the power input will be for a given velocity of shearing liquid.

It should be noted that each elongated opening or slot 120 or diffuser assembly 110 has a gap which can be easily set during manufacture of the diffuser assemblies to provide the desired relationship between the width of the stream of water flowing through the slots and the gas bubbles formed at the sides of the slots. Or, if desired, the width of the slot may be left adjustable — as, for example, from zero to some predetermined width — so that it may be changed for various conditions of use of the apparatus.

FIG. 3 gives a schematic cross sectional view of another embodiment of the gas transmitting body of this invention. In this embodiment, cylindrical gas transmitting body 172 has a plurality of gas transmitting passages 174 extending therethrough, each of which passages terminates in a capillary opening 176 at gas diffusing surface 178. Annular shearing liquid transmitting slot 180 is formed by cylindrical slot-defining member 182, positioned concentrically with member 172. As with the embodiment of FIG. 2, gas is introduced into gas plenum 160 within member 172 and flows out through capillary passages 174 to gas diffusing surface 178, where nascent gas bubbles are formed at capillary openings 176 and are sheared off by the shearing liquid flowing longitudinally through slot 180.

GAS TRANSMITTING BODY

Capillary openings 154 have substantially the same shape, size, and location in liquid transmitting slot 120 in both gas diffusing surfaces 146 and 148, on opposite sides of the slot (FIG. 2). Gas transmitting passages 158 are preferably substantially perpendicular to the planes tangent to gas difussing surfaces 146 and 148, respectively. The latter surfaces are preferably generally planar, but need not be exactly so.

To achieve the smallest bubbles possible with this invention, the material surrounding capillary openings 154 in gas diffusing surfaces 146 and 148 should be one having a low wettability, or high contact angle, with the shearing liquid that flows through slot 120. Thus, the material is desirably one — such as, for example, polystyrene or polyethylene — having a contact angle of at least 60° with tap water when that liquid is the shearing medium used with this invention.

Opens ends 154 of capillary passages 158 must have a small diameter if small bubbles are to be formed as gas flows from the ends of the capillary tubes. In the actual embodiment of which FIG. 2 is a schematic representation, capillary passages 158 are defined by hollow fiber glass tubes having cylindrical internal passages with a diamerter of from about 3 to about 30 microns, with their median diameter being about 8 microns. Hollow fiber glass tubes with a diameter from about 6 microns to about 12 microns may also be used.

As disclosed in my parent application Ser. No. 123,693, now abandoned, these straight fiber glass tubes are relatively easy to embed in support bars 166 in parallel relationship with each other and in a prependicular relationship with the central plane of slot 120. This embedding of capillary tubes 158 may be accomplished, for example, by positioning the tubes in the desired relationship and flowing a suitable sealing material 162 around the tubes. When sealing material or binder 162 solidifies, it sealingly interconnects capillary tubes 158 to form the bars 166 and prevent fluid flow around the tubes.

Other forms of the gas transmitting body of this invention may be used, if desired. The gas transmitting body may be formed, for example, by drilling holes in member 166 or may be formed from porous sintered metal, poro ceramic material, metal or plastic screen or mesh material, various other woven materials, a porous sheet or membrane, or any other porous or foraminous body having capil openings in a gas fusing surface. As explained above, the term "capillary openings" is used in this specification and claims to mean any openings small enough to produce fine gas bubbles, no matter what the nature of the gas diffusing surface is on which the bubbles are formed, or the nature of the gas transmitting passages through which gas flows to reach those openings.

Other porous composite materials besides hollow capillary strands 158 embedded in sealing material or binder 162 may also be used. In addition, solid filaments of glass, plastic or metal may be fused or sintered together in bundles to define gas transmitting passages in the form of the interstices between adjacent, substantially parallel filaments. Solid glass or plastic filaments are available, for example, with outside diameters of about 10 to 20 microns, and solid metal wire with outside diameters of about 40 to 80 microns. When such filaments are pressed together and fused or sintered, the resulting interstices between filaments will provide quite small gas transmitting passages, which terminate in capillary openings at which fine gas bubbles can be formed and sheared off in accordance with the teaching of this invention.

Whatever the material may be of which the gas transmitting body is formed, the gas transmitting body and its gas diffusing surface should preferably have the characteristics discussed below in connection with the illustrative showing of FIG. 4.

Since capillary tubes 158 in the embodiment shown are relatively small and closely spaced along the entire length of the slot 120, a large number of bubbles of a small diameter can be formed along sides 146 and 148 of slot 120. Bubbles of air in water ranging up to about 100 or 200 microns in diameter are readily obtained. With a preferred embodiment of the bubble shearing apparatus of my parent application, bubbles of air can be formed in water which have a median diameter of only about 25 to 30 microns. With higher viscosity liquids such as sewage, the majority of the bubbles will be even smaller.

As has been pointed out, the showing in FIG. 2 is a schematic one. In particular, gas transmitting passages 158 which extend through the wall of gas transmitting body or gas bar 166 to form capillary openings 154 in gas diffusing surfaces 146 and 148 are shown schematically embedded in hardened binder 162 as a matrix. As shown, capillary tubes 158 and binder 162 are secured on both sides of the assemblage to support plates 170 to form gas bar 166 enclosing gas plenum 160.

FIG. 4, on the other hand, is drawn from a photomicrograph made of an actual gas diffusing surface 146 or 148 in a gas bar 166. Capillary openings 154 are the open ends of discrete hollow fiber glass capillary strands or tubes 158 embedded in hardened epoxy plastic 162 as a matrix. Support plates 170, which complete gas diffusing surface 146, are indicated by broken lines on either side of FIG. 4. The distance between the two plates is about 0.020 inches.

The flow of shearing liquid across gas diffusing surface 146 (or 148) in FIG. 4 is from left to right in the figure, while the gas flow is out of the paper. Nascent gas bubbles formed at capillary openings 154 are thus sheared off as extremely fine bubbles, and are swept to the right towards the body of liquid into which they are to be diffused.

The maximum bubble size produced with the gas transmitting body of this invention is affected by many factors. One of the most important of these is the size of capillary openings 154 in gas diffusing surface 146 or 148; substantially all the capillary openings in the gas diffusing surface should have a diameter no larger than about 100 microns. Considerably improved results are obtaned if substantially all the capillary openings have a diameter no larger than about 50 microns, with further improvement when that figure is about 25 microns. For preferred results, the maximum capillary diameter should be about 5 microns.

Another measure of the size of the capillary openings is related to the bubble size that is desired from use of this invention. When the apparatus of this invention is designed to diffuse into a body of liquid gas bubbles of a predetermined size, the maximum diameter of the capillary openings in the gas diffusing surface should be no greater than about that predetermined size. For better results, the maximum capillary diameter should be no more than approximately ½ the predetermined maximum bubble diameter, and for best results no more than about ¼ that dimension.

In general, the capillary diameters should preferably be made as small as is practicable without making the gas pressure drop through the capillaries too high.

Each fiber glass hollow capillary strand or tube 158 has a cross section of substantially uniform size and shape throughout its length, being substantially a right circular cylinder in shape. As a consequence, each of the hollow capillary strands provides a straight, unimpeded path for gas flow through the gas transmitting body past which the shearing liquid flows. The passage provided by each hollow capillary strand 158 should preferably extend, adjacent its respective capillary opening, in a direction substantially perpendicular to the plane tangent to gas diffusing surface 146. It is believed that regularity in all these aspects of the size, shape and orientation of gas passages 158, by tending to reduce turbulence within those passages, will contribute to greater uniformity of bubble size in the fine bubbles resulting from the use of this invention.

Gas turbulence within capillary passages 158 should also be minimized by selecting a length for each passage that is at least 10 times the diameter of the passage. It is believed that an L/D ratio of at least 20/1 will give still better results.

The gas transmitting capillary passages 158 should also have a minimum L/D ratio to minimize backing up by the shearing liquid after a gas bubble has been sheared from capillary opening 154. Backing up of liquid can result in clogging, when the liquid evaporates and precipitates out dissolved salts after the gas again fills the capillary passage. These advantages of a minimum L/D ratio for the gas passages must of course be balanced against the disadvantage of any increase in the pressure drop through the passages.

In FIG. 2, capillary openings 154 are arranged in a plurality of straight rows perpendicular to the flow of shearing liquid through slot 120. In FIG. 4, the capillary openings are randomly located across gas diffusing surface 146. Although the benefits of the present invention can be obtained with only a few capillary openings disposed along the direction of flow, there should be an average of at least about 5 openings in that direction in substantially all portions of the surface. If a straight edge rule is laid across FIG. 4 in the direction of shearing liquid flow (from left to right across the page), it will be seen that in this embodiment of a gas diffusing surface there are on the average more than 10 capillary openings distributed across that surface from its inlet end to its discharge end. An average of as many as 20 to 40 openings in the direction of shearing liquid flow have been used to advantage, and still more could be employed if desired.

To take the greatest advantage of the fine bubble formation resulting from the use of this invention, the land areas in the gas diffusing surface should not be too narrow, or in other words capillary openings 154 should not be too closely spaced to each other. To this end, each opening 154 is preferably surrounded by a minimum land area on all sides that is sufficiently extensive in a plane generally tangent to the outermost points on said gas diffusing surface to substantially avoid coalescence or collision of a gas bubble formed at that opening with a bubble formed at any of the other single openings to produce a bubble having a diameter larger than the predetermined maximum bubble diameter. Some such combining of gas bubbles either at their point of formation or downstream is acceptable, but this effect should be minimized as much as is practicable.

In a preferred embodiment, each capillary opening 154 is surrounded by a minimum land area elliptical in shape that extends on each side of the opening in the direction perpendicular to the direction of liquid flow through the liquid transmitting slot by a distance at least about equal to the maximum bubble diameter, and on each side of the opening in the direction of liquid flow by a distance equal to at least about three times the maximum bubble diameter, measured in a plane generally tangent to the outermost points on the gas diffusing surface.

Gas diffusing surface 146 shown in FIG. 3 is generally planar in configuration, to produce greater stability in the laminar flow through slot 120, and thus the best fine bubble formation. A planar gas diffusing surface will produce sharper edges for capillary openings 154, which should result in smaller bubbles more nearly uniform in size. In apparatus for use in sewage treatment, it will also help reduce clogging of slots 120 by solids suspended in the sewage that passes through the slots as the shearing liquid.

The size of the bubbles can be further decreased if the wettability of the material surrounding the capillary openings in the gas diffusing surface with the shearing liquid is low, or in other words the contact angle is high. Both hollow fiber glass strands 158 (which terminate in capillary openings 154) and epoxy matrix material 162 have a contact angle with tap water of approximately 20°. The preferred contact angle when tap water is the shearing liquid is at least about 60°.

EXAMPLES

Figure 5:
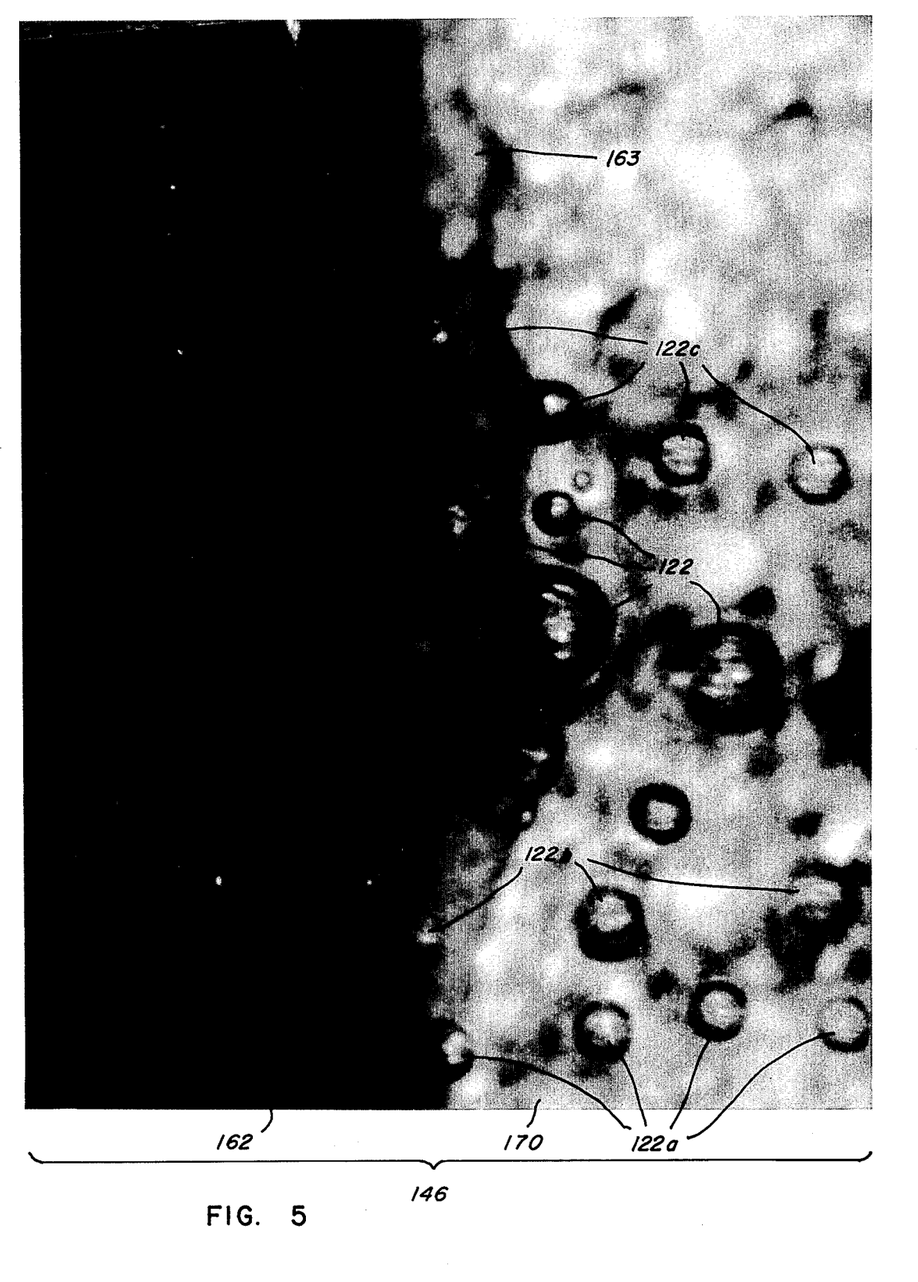
FIGS. 5 and 6 are photomicrographs, at an enlargement of about 280 times in the original figure submitted as a part of this application, showing the formation of fine bubbles of air in water resulting from the use of the gas transmitting body of this invention.
Figure 6:
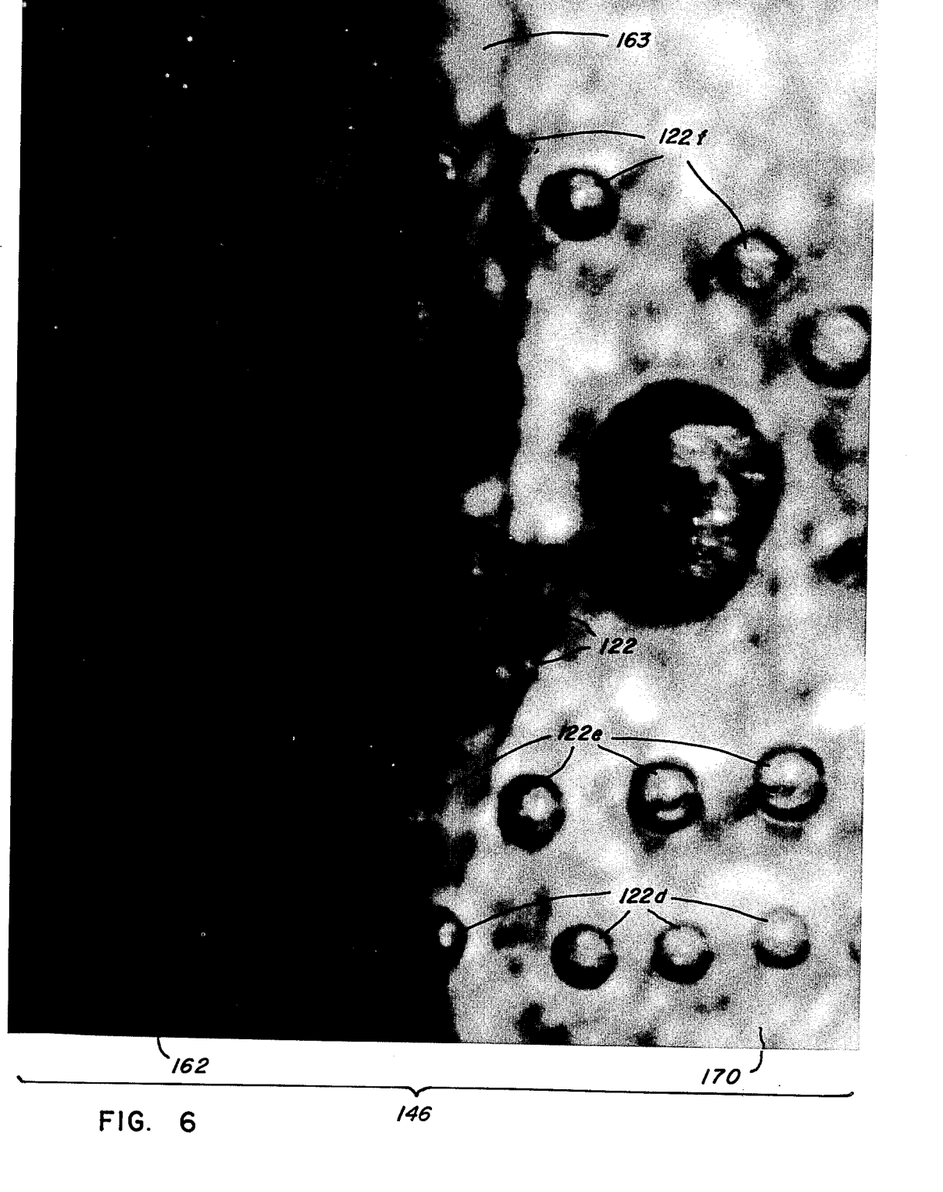

FIGS. 5 and 6 are photomicrographs, at an enlargement of about 280 times in the original figure submitted as a part of this application, which show the formation of very fine bubbles of air resulting from the use of the present invention.

These photomicrographs show an identical area in a gas diffusing surface and generally similar bubble formations, but were taken at different times so that they show different groups of bubbles in the respective bubble formations. One of the parallel planar sides of the shearing liquid transmitting slot was a gas diffusing surface of the type shown in FIG. 14. The other side was a glass plate through which the photomicrographs were taken. The shearing liquid was tap water.

The dark portions on the left-hand side of the photomicrographs in FIGS. 5 and 6 represent hollow capillary strands 158 embedded in epoxy binder 162 as a matrix, but because of the lighting problem, capillary openings 154 cannot be distinguished. A few gas bubbles 122 sheared from openings 154 by the advancing shearing liquid can be made out faintly over these dark portions of gas diffusing surface 146 where they join the medium dark, narrow, vertical band 163 (which may represent a layer of epoxy binder without any capillary strands 158 embedded therein) in the central part of eachphotomicrograph.

The bright portions of the right-hand side of FIGS. 5 and 6 represent the edges of metal support plates 170. Because there is more reflected light here, small air bubbles 122 can be seen quite clearly. The presence of identifiable groups of gas bubbles in relatively well aligned "strings," all of the bubbles in a given string being very nearly of the same size, shows the presence of the substantially parallel laminar flow that is characterized above as one of the essential features of this invention. Strings of bubbles 122a, 122b and 122c in FIG. 5, as well as strings of bubbles 122d, 122e and 122f in FIG. 6, all provide clear evidence of substantially parallel laminar flow, including a partially developed laminar boundary layer. The strings of bubbles are not entirely straight because of minimal "detours," such as might be caused by tiny local irregularities in the gas diffusing surface, but such minor deviations are always to be expected even in highly stable laminar flow. Presumably each separately identifiable string of bubbles originated at a different capillary opening.

If the few atypically large or small bubbles in FIGS. 5 and 6 are omitted from consideration, it is seen that the great bulk of the bubbles are quite uniform in size. Thus, the diameter of the smallest bubbles that fall within normal limits of size appear to have diameters approximately two-thirds as large as the diameters of the largest bubbles that fall within those normal limits.

Photomicrographs of somewhat larger fields showing similar air bubble formation (which were made at an enlargement of about 200 times, and include the partial views seen in FIGS. 5 and 6, respectively) were examined with the aid of a sizing grid in the form of a clear plastic overlay. In this manner, the estimated average bubble sizes and maximum bubble sizes given below were determined for the two larger photographs. Similar determinations were also made for the other examples given below.

For all the photomicrographs examined (including FIGS. 5 and 6), the following conditions were held constant:

| | |
|---|---|
| Shearing liquid | Tap water |
| Water pressure | 3.0 psig |
| Median capillary size | 8 microns (approx.) |
| Active gas diffusing surface area | 0.00042 square feet |
| Slot width | 0.040 inches |
| Inlet end of slot to most remote capillary opening | 0.045 inches |
| Arrangement of capillary openings | As illustrated in FIG. 4 |

EXAMPLE 1

Six high speed frames were exposed under the following operating conditions:

| | |
|---|---|
| Liquid velocity | 8.3 ft./sec. |
| Gas pressure | 20 psig |
| Gas flow for 3 inch slot | 0.00175 scfm |
| Gas bar | Unsanded* |

*Note — In Examples 1 through 3, the gas transmitting bodies or "bars" were used as usually fabricated in accordance with this invention. In Examples 4 through 6, the edges of the gas bars that constitute the gas diffusing surfaces were sanded, in an effort to make those surfaces more uniform and thereby improve the bubble shearing action of the apparatus. As the bubble sizes obtained show, however, the sanding did not achieve the results desired, and actually appears to have produced larger bubbles than were produced with the unsanded gas bars.

The following results were observed when the photomicrographs taken under the indicated conditions were examined as explained above:

| | |
|---|---|
| Bubble size for all frames | 37 microns = median** |
| | 200 microns = maximum** |
| Bubble size for 4th frame (of which FIG. 5 is a portion) | 39 microns = median |
| | 120 microns = maximum |
| Bubble size for 7th frame (of which FIG. 6 is a portion) | 39 microns = median |
| | 200 microns = maximum |

**Note — In determining both median and maximum bubble size, all bubbles were considered, including any atypical bubbles that fall at the extremes of size.

B

Seven high speed frames were exposed under the following operating conditions:

| | |
|---|---|
| Liquid velocity | 8.3 ft./sec. |

-continued

| | |
|---|---|
| Gas pressure | 30 psig |
| Gas flow for 3 inch slot | 0.0061 scfm |
| Gas bar | Unsanded |

The following results were observed when the photomicrographs taken under the indicated conditions were examined as explained above:

| | |
|---|---|
| Bubble size for all frames | 35 microns = median |
| | 225 microns = maximum |

EXAMPLE 2

Seven high speed frames were exposed under the following operating conditions:

| | |
|---|---|
| Liquid velocity | 16 ft./sec. |
| Gas pressure | 30 psig |
| Gas flow for 3 inch slot | 0.0061 scfm |
| Gas bar | Unsanded |

The following results were observed when the photomicrographs taken under the indicated conditions were examined as explained above:

| | |
|---|---|
| Bubble size for all frames | 28 microns = median |
| | 100 microns = maximum |

B

Seven high speed frames were exposed under the following operating conditions:

| | |
|---|---|
| Liquid velocity | 4.4 ft./sec. |
| Gas pressure | 20 psig |
| Gas flow for 3 inch slot | 0.00175 scfm |
| Gas bar | Unsanded |

The following results were observed when the photomicrographs taken under the indicated conditions were examined as explained above:

| | |
|---|---|
| Bubble size for all frames | 43 microns = median |
| | 200 microns = maximum |

EXAMPLE 3

Five high speed frames were exposed under the following operating conditions:

| | |
|---|---|
| Liquid velocity | 22.5 ft./sec. |
| Gas pressure | 30 psig |
| Gas flow for 3 inch slot | 0.0061 scfm |
| Gas bar | Unsanded |

The following results were observed when the photomicrographs taken under the indicated conditions were examined as explained above:

| | |
|---|---|
| Bubble size for all frames | 26 microns = median |
| | 75 microns = maximum |

B

Seven high speed frames were exposed under the following operating conditions:

| | |
|---|---|
| Liquid velocity | 22.5 ft./sec. |
| Gas pressure | 20 psig |
| Gas flow for 3 inch slot | 0.00175 scfm |
| Gas bar | Unsanded |

The following results were observed when the photomicrographs taken under the indicated conditions were examined as explained above:

| | |
|---|---|
| Bubble size for all frames | 25 microns = median |
| | 50 microns = maximum |

EXAMPLE 4

A

Five high speed frames were exposed under the following operating conditions:

| | |
|---|---|
| Liquid velocity | 7.9 ft./sec. |
| Gas pressure | 20 psig |
| Gas flow for 3 inch slot | 0.0032 scfm |
| Gas bar | Sanded |

The following results were observed when the photomicrographs taken under the indicated conditions were examined as explained above:

B

| | |
|---|---|
| Bubble size for all frames | 76 microns = median |
| | 200 microns = maximum |

Seven high speed frames were exposed under the following operating conditions:

| | |
|---|---|
| Liquid velocity | 7.9 ft./sec. |
| Gas pressure | 30 psig |
| Gas flow for 3 inch slot | 0.012 scfm |
| Gas bar | Sanded |

The following results were observed when the photomicrographs taken under the indicated conditions were examined as explained above:

| | |
|---|---|
| Bubble size for all frames | 98 microns = median |
| | 300 microns = maximum |

EXAMPLE 5

A

Six high speed frames were exposed under the following operating conditions:

| | |
|---|---|
| Liquid velocity | 16 ft./sec. |
| Gas pressure | 30 psig |
| Gas flow for 3 inch slot | 0.012 scfm |

-continued

| Gas bar | Sanded |
|---|---|

The following results were observed when the photomicrographs taken under the indicated conditions were examined as explained above:

| Bubble size for all frames | 52 microns = median<br>100 microns = maximum |
|---|---|

B

Seven high speed frames were exposed under the following conditions:

| Liquid velocity | 20.7 ft./sec. |
|---|---|
| Gas pressure | 30 psig |
| Gas flow for 3 inch slot | 0.012 scfm |
| Gas bar | Sanded |

The following results were observed when the photomicrographs taken under the indicated conditions were examined as explained above:

| Bubble size for all frames | 40 microns = median<br>75 microns = maximum |
|---|---|

EXAMPLE 6

A

Six high speed frames were exposed under the following operating conditions:

| Liquid velocity | 20.7 ft./sec. |
|---|---|
| Gas pressure | 40 psig |
| Gas flow for 3 inch slot | 0.027 scfm |
| Gas bar | Sanded |

The following results were observed when the photomicrographs taken under the indicated conditions were examined as explained above:

| Bubble size for all frames | 75 microns = median<br>125 microns = maximum |
|---|---|

B

Eight high speed frames were exposed under the following conditions:

| Liquid velocity | 20.7 ft./sec. |
|---|---|
| Gas pressure | 50 psig |
| Gas flow for 3 inch slot | 0.052 scfm |
| Gas bar | Sanded |

The following results were observed when the photomicrographs taken under the indicated conditions were examined as explained above:

| Bubble size for all frames | 100 microns = median<br>150 microns = maximum |
|---|---|

As is seen from the above results, the smallest bubbles were obtained with the unsanded bar under the operating conditions of Example 3, the next smallest bubbles with that bar under the conditions of Example 2, and the next smallest in Example 1. The same gas bar and target area were used in all these three examples.

With the sanded gas bar, the best bubble shearing was obtained in Example 5, and the next best in Example 6. Example 4 gave the poorest results. The bar with the sanded gas diffusing surface was in all other respects the same type of bar as the unsanded bar.

The bubble shearing of Examples 1 through 6, as explained above, was carried out with one wall of the shearing liquid transmitting slot formed by a flat glass plate, which made it possible to photograph sample gas bubbles produced under the indicated conditions. In Examples 7 through 9 below, the apparatus used was not modified in this way, but was operated as it would have been operated in actual use, with a gas diffusing surface similar to the surface illustrated in FIG. 4 on both sides of the shearing liquid transmitting slot.

EXAMPLE 7

Excellent oxygen bubble shearing was visually observed from use of one embodiment of the apparatus of this invention, with tap water as the shearing liquid, under substantially the following conditions:

| Slot width | 0.040 inches |
|---|---|
| Volumetric flow rate for shearing liquid | 2 gallons/min./inch of slot |
| Linear flow rate for shearing liquid | 15 ft./sec. |
| Gas pressure | 30 psig |
| Gas flow rate | 50 scfm/sq. ft. of active gas diffusing area |
| Median capillary diameter | 8 microns |

EXAMPLE 8

Excellent oxygen absorption, more than 90 percent of the oxygen supplied to the body of liquid, was obtained with the use of the same apparatus, with 1 percent suspended solids sewage as the shearing liquid, under substantially the following conditions:

| Slot width | 0.040 inches |
|---|---|
| Volumetric flow rate for shearing liquid | 2.5 gallons/min./inch of slot |
| Linear flow rate for shearing liquid | 20 ft./sec. |
| Gas pressure | 30 psig |
| Gas flow rate | 45 scfm/sq. ft. of active gas diffusing area |
| Median capillary diameter | 8 microns |

EXAMPLE 9

Excellent oxygen absorption, again more than 90 percent, was also obtained with use of the same apparatus, except that the slot width was set at 0.125 inches, with 6 per cent suspended solids sewage as the shearing liquid, under substantially the following conditions:

| Slot width | 0.125 inches |
|---|---|
| Volumetric flow rate for shearing liquid | 2.5 gallons/min./inch of slot |
| Linear flow rate for shearing liquid | 7–8 ft./sec. |

-continued

| | |
|---|---|
| Gas pressure | 30 psig |
| Gas flow rate | 15 scfm/sq. ft. of active gas diffusing area |
| Median capillary diameter | 8 microns |

Because of the higher viscosity of the 6 percent suspended solids sewage and the resulting improved bubble shearing, approximately the same oxygen absorption efficiency was obtained with 6 percent solids sewage as with 1 percent solids sewage, at about one-third the linear flow rate and approximately the same energy expended for pumping.

SPECIFIC EMBODIMENTS OF THE GAS TRANSMITTING BODY OF THIS INVENTION

Because of their elongated shape (best seen in FIGS. 8A and 14A), gas transmitting bodies 166 such as illustrated in FIG. 2 are for convenience usually referred to as gas bars.

Figures 8A, 8B, 9, 10A, 10B:
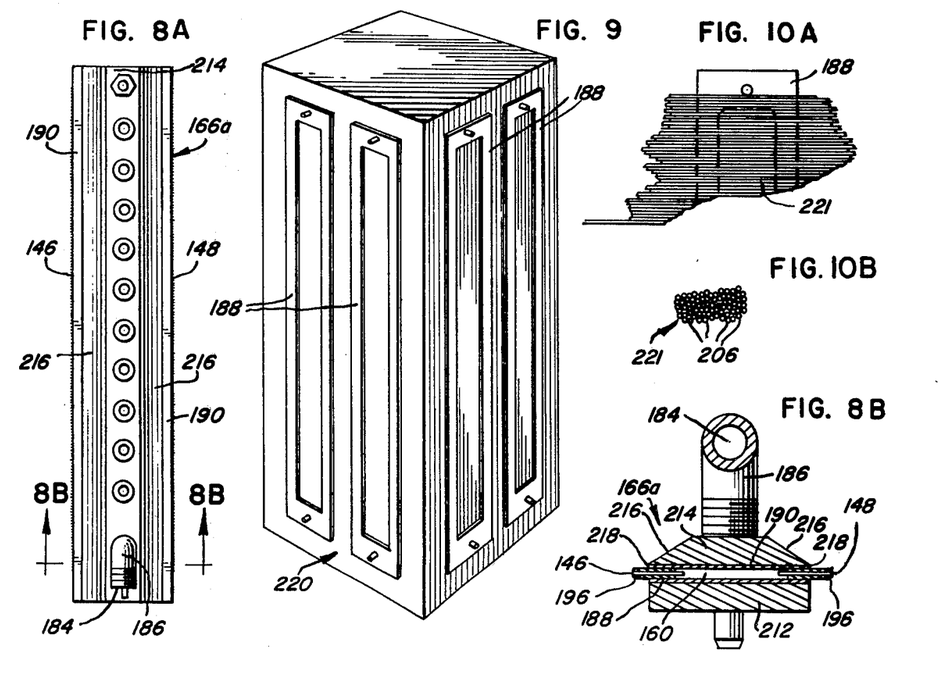
FIG. 8A is a plan view of a completed gas transmitting body whose fabrication includes the steps illustrated in FIGS. 7A through 7D.
FIG. 9 is a perspective view of a winding fixture on which a plurality of the support plates of FIG. 7A have been secured for positioning a plurality of lengths of roving comprised of hollow capillary strands across said plates in accordance with this invention.
FIG. 10A is a fragmentary plan view of one of the support plates of FIG. 9 showing a plurality of rovings of hollow capillary strands in position across said plate.
FIG. 10B is a schematic cross sectional view taken through one of the rovings of FIG. 10A.

FIGS. 8A and 8B show a gas bar 166a that may be incorporated in the gas diffusing apparatus of this invention in the manner illustrated schematically in FIG. 2. Gas bar 166a is an enclosed container with a gas inlet opening 184 provided through elbow joint 186, suitably threaded for attachment to a gas feeder line 130 (FIG. 2). This embodiment of the gas transmitting body has two walls 146 and 148 with a plurality of gas transmitting passages extending therethrough, to permit gas to escape from interior enclosed chamber 160. Walls 146 and 148 are the gas diffusing surfaces of gas bar 166a.

Figures 12B, 12C, 12D, 13B, 13C, 14A, 14B, 14C:
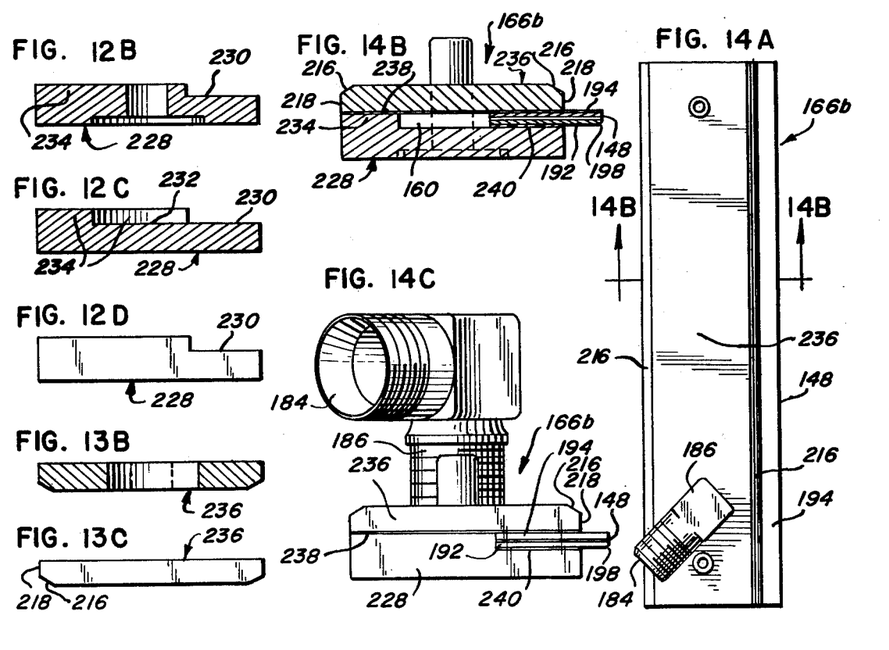
FIGS. 12B and 12C are cross sectional views taken along the lines 12B—12B and 12C—12C, respectively, of FIG. 12A.
FIG. 12D is an end view of the bottom cover plate of FIG. 12A.
FIG. 13B is a cross sectional view taken along the line 13B—13B of FIG. 13A.
FIG. 13C is an end view of the top cover plate of FIG. 13A.
FIG. 14A is a plan view of an assembled gas transmitting body made according to this form of the method of fabrication of such a body.
FIG. 14B is an enlarged cross sectional view taken along the line 14B—14B of FIG. 14A.
FIG. 14C is a similarly enlarged end view of the assembled gas transmitting body of FIG. 14A.

FIGS. 14A through 14C show another embodiment of a gas bar 166b for use with this invention. This embodiment has only one gas diffusing surface, wall 148, to permit gas to escape from interior enclosed chamber 160. As in gas bar 166a, inlet opening 184 and fitting 186 are provided in gas bar 166b.

As will be explained in more detail below, each gas diffusing surface 146 and 148 in specific gas bars 166a and 166b comprises a sandwich of two thin metal support plates — members 188 and 190 for gas bar 166a, and 192 and 194 for gas bar 166b — on both sides of a plurality of hollow fiber glass capillary strands 206 embedded in epoxy 162 as a matrix. Because the support plates are so thin (FIGS. 8B, 14B and 14C), capillary openings 154 lie in close proximity to boundary defining edges 196 and 198 of the gas diffusing surfaces of gas bars 166a and 166b, respectively, which become the leading edges of slots 120 when the gas bars are in place in the gas diffusing apparatus of this invention. (The flow of the shearing liquid in the bubble shearing apparatus in which gas bar 166a or 166b is installed is in the upward direction in FIGS. 8B, 14B and 14C.)

As used in this specification and claims, the term "gas diffusing surface" includes the sides of the two support plates but, as already indicated above, the "active area" of that surface includes only the area defined by the boundary lines tangent to the outermost capillary openings. (See FIG. 4, for example.)

In the embodiments shown in FIGS. 8 and 14, each support plate is about 0.025 inches thick, which brings the capillary openings as close to the leading edge of the gas diffusing surface as is structurally practicable in these embodiments. Since the layer of hollow capillary strands 26 embedded in matrix 162 is about 0.020 inches thick, this positions the most remote capillary openings a total of about 0.045 inches from leading edges 196 and 198, respectively.

Good results can be obtained under some operating conditions with the distance from the indicated boundary defining edge of the gas bar of this invention to the most remote capillary openings being about 1.0 inch. Improved results are obtained if that distance is about 0.5 inch, and still better results if it is about 0.1 inch, 0.05 inch, or even smaller.

Leading edges 196 and 198 are rounded to improve the stability of flow through slot 120. This feature helps produce stable laminar flow, including a partially developed laminar boundary layer, in the shearing liquid transmitting slot. The rounded edges are shown in FIGS. 8B, 14B and 14C as accurately as is possible at the scale of those drawings.

Gas diffusing surfaces 146 and 148 in gas bars 166a and 166b are similar to the surfaces shown in FIG. 4 and described above in this specification. The surfaces are generally planar, and the gas transmitting bars of which they are a part are constructed in a manner similar to that described above in connection with FIG. 4. This includes capillary passages of a shape, size and orientation similar to the capillary passages indicated in FIG. 4, as well as capillary openings of an arrangement and location similar to the openings shown in FIG. 4.

METHODS OF THIS INVENTION

FIGS. 7 through 14 illustrate two forms of the method of this invention for fabricating a gas transmitting body or gas bar, to be used for example in the oxygenation of sewage in the form either of so-called "mixed liquor" having about 1 percent suspended solids or aerobic digester sludge having about 6 percent suspended solids.

Figure 7A:
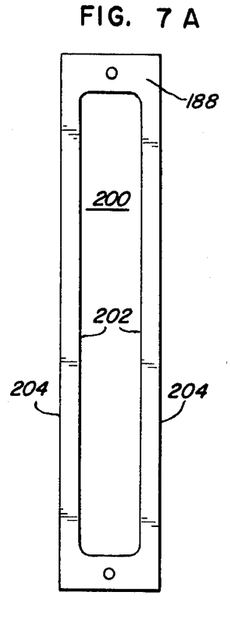
FIGS. 7A through 7D show a succession of steps in the fabrication of a gas transmitting body according to this invention.

FIG. 7A is a plan view of thin bottom support plate 188, which is rectangular in over-all shape and has a generally rectangular opening 200 in the interior portion thereof to provide an elongated O-shaped member. This member has two inner side walls 202 that are adapted to form a part of the interior wall of gas plenum 160, and two outer side walls 204 adapted to form a part of the exterior wall of the gas plenum.

Figure 7B:
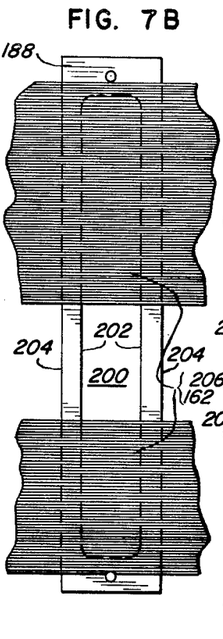

As shown in FIG. 7B, the first step of this method of fabricating gas bar 166a is to position a plurality of hollow capillary strands 206 and a supply of binder 162 across the top face of thin support plate 188 so that the hollow strands are aligned substantially normal to side walls 202 and 204. In this position, the strands extend beyond plate 188 on both the inner and outer sides of the plate.

The binder applied in this first step may be already present upon the fiber glass as received from the manufacturer of the hollow capillary strands, or it may be added by the fabricator of the gas bar either before or after the strands are positioned across bottom support plate 188. When desired, additional binder may be added to the hollow capillary strands in position upon plate 188, before thin top support plate 190, similar in all respects to bottom support plate 188, is added (FIG. 8C) to produce the "sandwich" of two plates with hollow capillary strands and binder between them.

This sandwich is compressed to cause binder 162 to fill all the crevices between strands 206 and between the strands and support plates 188 and 190. The sandwich is then held compressed until the binder is hardened to embed the hollow capillary strands in the hardened binder as a matrix. Binder 162 may if desired be a heat curable binder, and in that case heat is applied while the sandwich is compressed, to cure the binder.

In the next step of this method of fabricating gas bars, the portions 208 of hollow capillary strands 206 embedded in matrix 162 that extend outwardly beyond exterior side walls 204 of support plates 188 and 190 are trimmed back generally to walls 204 to form gas diffusing surfaces 146 and 148. The surface of the exterior side wall of the gas bar that is comprised of a first wall 204, a plurality of capillary openings 154 surrounded by epoxy 162, and a second wall 204 is preferebly made as nearly flat as possible, but the extent of minor departures from the desired planar surface will be determined by the cutting tool and trimming method employed.

The portions 210 of hollow capillary strands 206 embedded in matrix 162 that extend inwardly beyond interior side walls 202 of support plates 188 and 190 are severed to form the inlet ends of gas transmitting passages 158. It is not essential that these ends be trimmed back to walls 202, but only that they provide passages for gas to leave gas plenum 160.

Gastight cover plates 212 and 214 are next affixed to the sandwich, on opposite sides thereof, to form gas plenum 160 into which gas can be introduced through inlet opening 184, and out of which gas can flow through hollow capillary strands 158. A layer of binder, in the form of liquid or in the form of a flat sheet of appropriate dimensions as desired, can be interposed between bottom support plate 188 and its associated cover plate 212 and between top support plate 190 and its associated cover plate 214. All the elements of the gas bar are held compressed until the binder has hardened, with the additional use of heat if the binder is heat curable.

Chamfers 216 are preferably provided on the outer edges of upper backing plate 214 that lie adjacent the flow path of the shearing liquid as the liquid flows out from the discharge end of the liquid transmitting slot (in an upward direction in FIGS. 8B, 14B and 14C, when the gas bar is installed in place in bubble shearing apparatus constructed according to this invention. The reason for these chamfers is to avoid the "attachment" of the discharge flow from the shearing liquid transmitting slot to walls 18 of top backing plate 214 that would occur if those walls were not cut away as indicated. Any such flow attachment would tend to cause the shearing liquid jet stream and the fine gas bubbles contained therein to turn the right angled corner that would be presented by the full wall, and thus cause the jet stream to widen out as it entered the body of liquid into which the gas bubbles were being dispersed. Such a widening of the jet stream would reduce the effectiveness of the distribution of fine gas bubbles throughout the liquid into which they were being introduced; it is preferred to keep the jet stream narrow enough, if possible, that its total angle of spread in the initial stages is no more than about 15°.

Figures 7C, 7D:
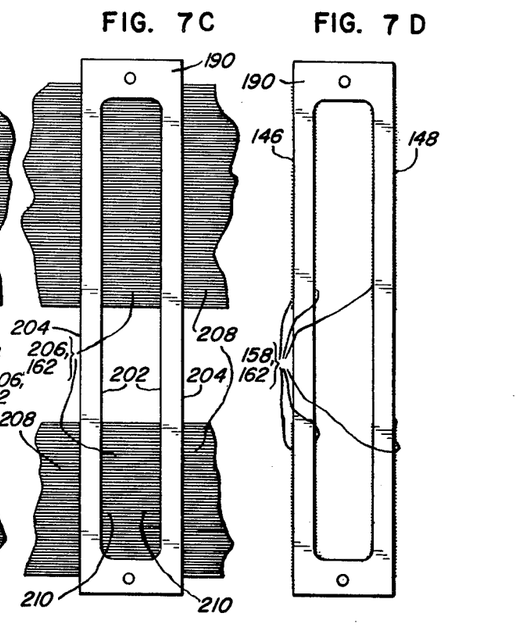

By use of a special winding fixture, the fabrication steps illustrated in FIGS. 7A through 7C may be carried out on a number of units at one time. With winding fixture 220 as illustrated in FIG. 9, eight bottom support plates 188 may be secured to the fixture, two on each vertical wall of the fixture, and hollow fiber glass capillary strands 206 wrapped around all eight plates at the same time. With the necessary binder 162 in place, top support plates 190 may be positioned to form eight sandwiches, and the necessary compression and heating steps completed to produce eight separate units such as illustrated in FIG. 7C.

FIG. 10A illustrates the positioning on bottom support plate 188 of a plurality of lengths of roving 221, in much the same manner as individual capillary strands are positioned in FIG. 7B. Each length of roving 221, as seen in the schematic cross-sectional view of FIG. 10B, is formed of a plurality of hollow capillary strands 206. The capillary strands in substantially all said lengths of roving 221 are generally parallel to each other.

FIGS. 11A through 14C illustrate another type of gas bar 166b, which is fabricated in a manner very similar to the method of fabricating gas bar 166a already described. Hollow fiber glass capillary strands 206 and a quantity of binder 162 are sandwiched between bottom plate 192a – 192b and top plate 194a– 194b, and the necessary compressing and curing steps are carried out. Outer portions 222 of capillary strands 206 embedded in binder 162 are trimmed back to form a gas diffusing surface, and inner portions 224 of the strands and binder are severed. In addition, the end portions of support plates 192 and 194 are severed along lines 226 representing the central longitudinal axis of the plates, to form two separate sandwiches, each with a single gas diffusing surface 148.

Bottom cover plate 228 has a groove 230 adapted to receive an assembled sandwich of capillary strands and binder between two support plates. Cover plate 228 has a second groove 232 surrounded by an elongated C-shaped wall 234. The cross sectional views of FIGS. 12B and 12C, and the end view of FIG. 12D (taken from the bottom of FIG. 12A), show the general configuration of cover plate 228.

Figures 11A, 11B, 12A, 13A:
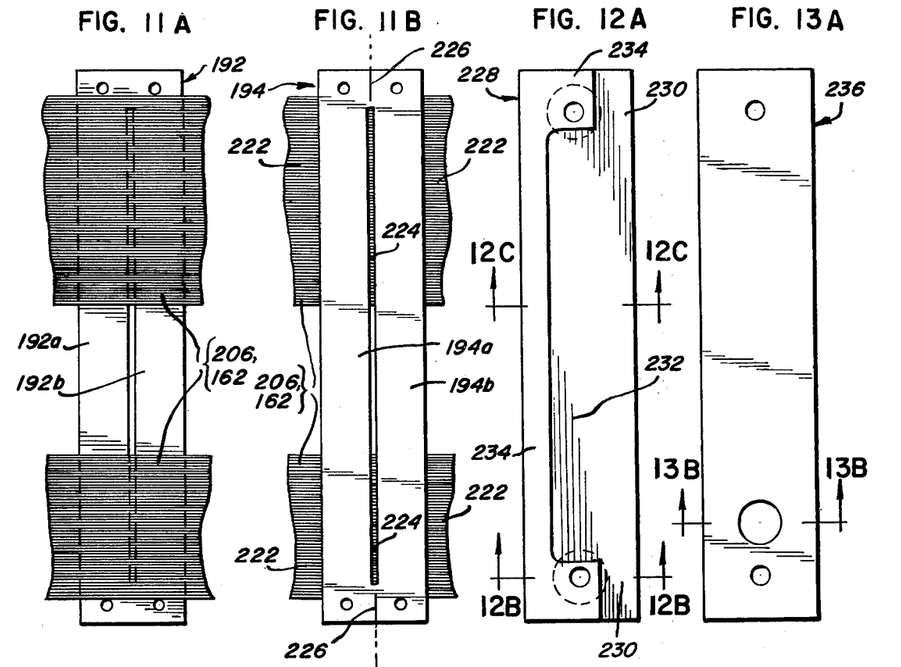
FIGS. 11A and 11B are plan views of steps in the fabrication of another sandwich of hollow capillary strands embedded in a matrix between two support plates that is incorporated in a gas transmitting body according to this invention.
FIG. 12A is a plan view of the bottom cover plate of said gas transmitting body.
FIG. 13A is a plan view of the top cover plate of said gas transmitting body.

Top cover plate 236, as is seen from the plan view of FIG. 13A and the end view of FIG. 13C (taken from the bottom of FIG. 13A, has a flat planar surface. When top cover plate 236 is placed upon bottom cover plate 228, the assembled plates perform two functions. First, they secure between them the sandwich of two support plates on each side of a layer of hollow capillary strands embedded in binder as a matrix (FIGS. 14B and 14C). Second, between them they define gas plenum 160, surrounded on three sides by wall 234 (FIG. 12C) and on the fourth side by the sandwich (FIG. 14B). Binder layers 238 and 240 complete the gastight assemblage of gas bar 166b.

The above detailed description of this invention has been given for clarity of understanding only. No unnecessary limitations should be understood therefrom, as modifications will be obvious to those skilled in the art.

What is claimed is:

1. A method of fabricating a gas transmitting body for use in apparatus for diffusing fine gas bubbles into a body of liquid which comprises:
  positioning a plurality of hollow capillary strands and binder across one face of a first support plate, said support plate being generally rectangular in shape and having a generally rectangular opening in the interior position thereof to provide an elongated O-shaped member having two sides adapted to form a part of the interior wall of a gas plenum and two sides adapted to form a part of the exterior wall of said gas plenum, said hollow strands being positioned in said first step substantially normal to the longitudinal axis of said support plate and to each of said two side walls, to extend across said rectangular opening and beyond the support plate on both exterior sides thereof;

positioning a second support plate having a similar shape to that of said first support plate adjacent said plurality of hollow capillary strands and binder to form a sandwich of said two plates with said strands and binder therebetween;

holding said sandwich until said binder is hardened to embed said hollow capillary strands in the binder as a matrix, to provide gas transmitting passages extending through said matrix;

trimming back generally to said exterior side walls of said support plates the portions of said hollow strands embedded in said matrix that extend outwardly beyond said side walls, to form a gas diffusing surface with capillary openings distributed across the same; and severing the portions of said hollow stands embedded in said matrix that extend inwardly beyond said interior side walls of said support plates, to form the inlet ends of said gas transmitting passages.

2. The method of claim 1 which includes the steps of severing the end portions of said two elongated O-shaped support plates along the central longitudinal axis of said plates, after the binder between said two O-shaped plates has hardened to form a matrix in which said capillary strands are embedded, to form two generally rectangular gas transmitting bodies.

3. The method of claim 1 which includes the step of positioning a plurality of lengths of roving, each of which lengths of roving is formed of a plurality of hollow capillary strands, across said one face of said first support plate.

4. The method of claim 3 in which said hollow capillary strands in substantially all said lengths of roving positioned across said one face of said support plate are generally parallel to each other.

5. The method of claim 1 which includes the steps of securing a plurality of said first support plates to a winding fixture, and winding said plurality of hollow capillary strands successively around said plurality of support plates to position a strand first across one support plate and then across the next plate.

6. The method of claim 5 which includes the step of winding a plurality of lengths of roving, each of which lengths of roving is formed of a plurality of hollow capillary strands, successively around said plurality of support plates secured upon said winding fixture, to position a length of roving first across one support plate and then across the next plate.

7. The method of claim 1 which includes the steps of affixing a gastight cover plate to one side of said sandwich with said hollow capillary strand ends trimmed and severed as described, and affixing a gastight cover plate with an inlet opening therein to the other side of said sandwich, to form a gas plenum into which gas can be introduced under pressure through said inlet, and out of which said gas can flow through said plurality of hollow capillary strands.

8. The method of claim 7 which includes positioning a layer of binder between each of said support plates and its associated cover plate.

9. The method of claim 8 which includes the steps of pressing said two cover plates against the respective layer of binder and support plate associated therewith, and holding said elements compressed until said binder has hardened.

10. The method of claim 9 in which each of said layers of binder comprises a heat curable binder, and which includes the step of applying heat, while said elements are under compression, to said layers of binder to cure the same.

* * * * *

UNITED STATES PATENT AND TRADEMARK OFFICE
CERTIFICATE OF CORRECTION

PATENT NO. : 4,024,618

DATED : May 24, 1977

INVENTOR(S) : Gilbert M. Kyrias

It is certified that error appears in the above—identified patent and that said Letters Patent is hereby corrected as shown below:

Col. 1, line 65, before "remote" insert --most--.

Col. 2, line 26, "one" should be --on--; line 34, "bars" (without quotes) should be --"bars"--.

Col. 3, cancel lines 6-8; line 51, "over" should be --other--; line 64, delete the period after the "O" (first occurrence).

Col. 5, line 44, "bars" (without quotes) should be --"bars"--; line 57, "or" should be --by--; line 64, "defined" is misspelled.

Col. 6, line 48 and 49, cancel second occurrence of phrase "about two times the width of the slot, although it may be less."

Col. 7, line 63, "diffusing" is misspelled.

Col. 8, line 12, "diameter" is misspelled; line 20, "prepen-" should be --perpen- --; line 33, "poro" should be --porous--; line 36, "capil" should be --capillary--.

Col. 9, line 12, "bar" (without quotes) should be --"bar"--; line 41, "obtained" is misspelled.

UNITED STATES PATENT AND TRADEMARK OFFICE
CERTIFICATE OF CORRECTION

Page 2 of 2

PATENT NO. : 4,024,618
DATED : May 24, 1977
INVENTOR(S) : Gilbert M. Kyrias

It is certified that error appears in the above—identified patent and that said Letters Patent is hereby corrected as shown below:

- Page 2 -

Col. 11, line 1, "3" should be --4--; line 48, separate "each" and "photomicrograph."

Col. 12, line 33, beneath "EXAMPLE 1" insert --A--.

Col. 13, line 16, beneath "EXAMPLE 2" insert --A--; line 54, beneath "EXAMPLE 3" insert --A--.

Col. 17, line 67, "26" should be --206--.

Col. 18, line 27, "METHODS" should be --METHOD--; line 54, "facturerof" should be --facture of--.

Col. 19, line 40, after "14C" close parentheses; line 45, "18" should be --218--.

Col. 20, line 36, after "13A" close parentheses; line 59, "position" should be --portion--.

Col. 21, line 20, "steps" should be --step--.

Signed and Sealed this

First Day of April 1980

[SEAL]

Attest:

SIDNEY A. DIAMOND

Attesting Officer

Commissioner of Patents and Trademarks